(12) United States Patent
Kim et al.

(10) Patent No.: US 9,251,986 B2
(45) Date of Patent: Feb. 2, 2016

(54) RECHARGEABLE BATTERY

(76) Inventors: In Kim, Yongin-si (KR); Duk-Jung Kim, Yongin-si (KR); Hyung-Sik Kim, Yongin-si (KR); Jeong-Jun Kim, Yongin-si (KR); Zin Park, Yongin-si (KR)

( * ) Notice: Subject to any disclaimer, the term of this patent is extended or adjusted under 35 U.S.C. 154(b) by 627 days.

(21) Appl. No.: 13/353,503

(22) Filed: Jan. 19, 2012

(65) Prior Publication Data

US 2013/0011699 A1 Jan. 10, 2013

Related U.S. Application Data

(60) Provisional application No. 61/504,885, filed on Jul. 6, 2011.

(51) Int. Cl.
| | |
|---|---|
| *H01M 10/42* | (2006.01) |
| *H01H 85/36* | (2006.01) |
| *H01M 2/26* | (2006.01) |
| *H01M 2/34* | (2006.01) |
| *H01M 2/06* | (2006.01) |
| *H01M 4/70* | (2006.01) |
| *H01M 10/04* | (2006.01) |
| *H01M 2/02* | (2006.01) |
| *H01M 2/12* | (2006.01) |
| *H01M 2/30* | (2006.01) |

(52) U.S. Cl.
CPC ............. *H01H 85/36* (2013.01); *H01M 2/06* (2013.01); *H01M 2/26* (2013.01); *H01M 2/348* (2013.01); *H01M 4/70* (2013.01); *H01M 10/0431* (2013.01); *H01M 10/0463* (2013.01); *H01M 2/0217* (2013.01); *H01M 2/1241* (2013.01); *H01M 2/30* (2013.01); *H01M 2200/103* (2013.01)

(58) Field of Classification Search
CPC ............. H01M 85/36; H01M 85/100431; H01M 10/0463; H01M 2200/103; H01M 2/0217
USPC ............................................. 429/7
See application file for complete search history.

(56) References Cited

U.S. PATENT DOCUMENTS

| | | | |
|---|---|---|---|
| 4,315,060 A | 2/1982 | Goebel et al. | |
| 5,258,238 A | 11/1993 | Shimada | |
| 5,644,282 A * | 7/1997 | Mehta et al. | 337/295 |
| 2005/0122203 A1 | 6/2005 | Jur et al. | |
| 2006/0019158 A1* | 1/2006 | Mori et al. | 429/174 |
| 2008/0297301 A1 | 12/2008 | Onken et al. | |

(Continued)

FOREIGN PATENT DOCUMENTS

| | | | |
|---|---|---|---|
| JP | 05-274994 A | | 10/1993 |
| JP | 05274994 A | * | 10/1993 |

(Continued)

OTHER PUBLICATIONS

English translation of JP 05274994 A, Oct. 1993, Okuno et al.*

(Continued)

*Primary Examiner* — Jonathan Jelsma
*Assistant Examiner* — Rashid Alam

(57) ABSTRACT

A rechargeable battery includes a case, an electrode assembly in the case, a current collecting member electrically connected to the electrode assembly, a fuse part in the current collecting member, and an elastic member adjacent to the fuse part. The elastic member is configured to provide an elastic force to the fuse part.

10 Claims, 13 Drawing Sheets

(56) References Cited

U.S. PATENT DOCUMENTS

| | | | |
|---|---|---|---|
| 2010/0247987 A1* | 9/2010 | Holung et al. | 429/62 |
| 2011/0183165 A1 | 7/2011 | Byun et al. | |
| 2011/0318634 A1* | 12/2011 | Uh et al. | 429/178 |
| 2012/0282502 A1* | 11/2012 | Kim | 429/82 |
| 2013/0017420 A1* | 1/2013 | Byun et al. | 429/61 |

FOREIGN PATENT DOCUMENTS

| | | |
|---|---|---|
| JP | 2006-012602 | 1/2006 |
| KR | 10-1999-0074762 A | 10/1999 |
| KR | 10-1036070 B1 | 5/2011 |
| WO | WO 2010/133176 A1 | 11/2010 |
| WO | WO 2010133176 A1 * | 11/2010 |

OTHER PUBLICATIONS

WO 2010133176 A1, Hong, Nov. 2010, WIPO.*

European Search Report in EP 12162741.8-1227 dated Oct. 19, 2012.

Chinese Office Action dated Jul. 16, 2015; Kim, et al.

* cited by examiner

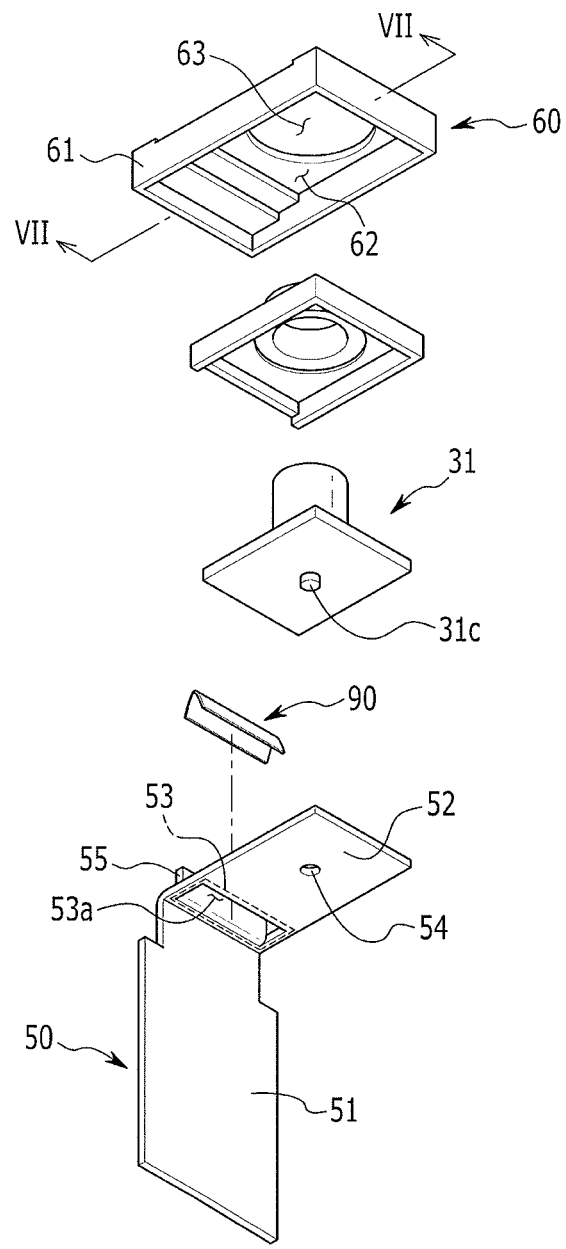

RECHARGEABLE BATTERY

CROSS-REFERENCE TO RELATED APPLICATION

The present application claims priority under 35 U.S.C. §119(e) to U.S. Provisional Application No. 61/504,885, filed on Jul. 6, 2011, and entitled: "Rechargeable Battery," which is incorporated herein by reference in its entirety.

BACKGROUND

A rechargeable battery is a battery that may be recharged. The rechargeable battery may be, e.g., a low-capacity rechargeable battery or a high-output rechargeable battery.

SUMMARY

Embodiments may be realized by providing a rechargeable battery that includes a case, an electrode assembly in the case, a current collecting member electrically connected to the electrode assembly, a fuse part in the current collecting member, and an elastic member adjacent to the fuse part. The elastic member is configured to provide an elastic force to the fuse part.

The elastic member may be an elastic plate. The fuse part may constitute a narrow region of the current collecting member, and the fuse part may be changeable from an untriggered condition to a triggered condition. The elastic member may have a first configuration in the untriggered condition of the fuse part and a second configuration in the triggered condition of the fuse part. The first configuration may be different from the second configuration.

The elastic member may have the second configuration when the fuse part is fractured or melted so as to impart the triggered condition. In the first configuration the elastic member may engage the fuse part. In the first configuration, the elastic member may have a compressed shape, and in the second configuration, the elastic member may have an expanded shape.

The fuse part may include a fuse hole defined by the narrow region of the current collecting member, and the elastic member in the second configuration may be in operative co-operation with the fuse hole to maintain the triggered condition.

The fuse part may include a fuse hole and the elastic member may be in the fuse hole in at least the first configuration. In the first configuration, the elastic member may be bent at a first predetermined angle, and in the second configuration, the elastic member may be bent at a second predetermined angle. The second predetermined angle may be greater than the first predetermined angle. In the first configuration, lateral ends of the elastic member may be spaced apart by a first distance, and in the second configuration, lateral ends of the elastic member may be spaced apart by a second distance. The second distance may be greater than the first distance.

The fuse part may include a fuse hole and the elastic member may be spaced apart from the fuse hole in the first and second configurations. In the first configuration, the elastic member may be bent at a first predetermined angle, and in the second configuration, the elastic member may be bent at a second predetermined angle. The second predetermined angle may be less than the first predetermined angle. In the first configuration, lateral ends of the elastic member may be spaced apart by a first distance, and in the second configuration, lateral ends of the elastic member may be spaced apart by a second distance. The second distance may be less than the first distance.

The current collecting member may include an electrode coupling part and a terminal coupling part bent from the electrode coupling part. The fuse part may be in the electrode coupling part or the terminal coupling part. The fuse part may include a fuse hole therein.

The fuse part may be in the terminal coupling part of the current collecting member. The elastic member may be in the fuse hole in at least the first configuration such that the elastic member may be surrounded by the terminal coupling part in at least the first configuration. The rechargeable battery may include an insulating member on the current collecting member, and elastic member may be between the electrode assembly and the insulating member.

The fuse part may be in the terminal coupling part of the current collecting member. The terminal coupling part may include a support protrusion at a peripheral edge of the fuse hole. The elastic member may abut the support protrusion in the first and second configurations.

The fuse part may be in the electrode coupling part of the current collecting member. The elastic member may include a first elastic branch extending from an elastic body in a first direction and a second elastic branch extending from the elastic body in a second direction. The second direction may be different from the first direction. In the first and second configurations, the first and second elastic branches may extend through the fuse hole.

The rechargeable battery may include an insulating member. The insulating member may include an elastic support protrusion and the elastic support protrusion may be adjacent the fuse hole. A fixing member may be on the fuse hole. The fuse part may be in the electrode coupling part of the current collecting member, in the first and second configurations, the elastic member may be in the fuse hole, and the elastic member may be between the fixing member and the elastic support protrusion.

The rechargeable battery may include an insulating member between the current collecting member and the electrode assembly, and the insulating member may support the elastic member. The fuse part may be in a terminal coupling part of the current collecting member and the fuse part may include a fuse hole therein. A fuse hole coupling protrusion of the insulating member may be in the fuse hole, and the elastic member may be in a coupling hole of the insulating member such that the elastic member may be between the terminal coupling part and the insulating member.

Embodiments may also be realized by providing a rechargeable battery that includes an electrode assembly, a case in which the electrode assembly is embedded, a cap plate coupled to an opening of the case, and an insulating member and an electrode current collecting member that are installed in the case. The electrode current collecting member is provided with a fuse part including a fuse hole and the fuse part is installed with an elastic structure made of an elastic material.

BRIEF DESCRIPTION OF THE DRAWINGS

Features will become apparent to those of ordinary skill in the art by describing in detail exemplary embodiments with reference to the attached drawings, in which:

FIG. 6 illustrates a partially exploded perspective view of a rechargeable battery, according to an exemplary embodiment.

DETAILED DESCRIPTION

Figure 1:
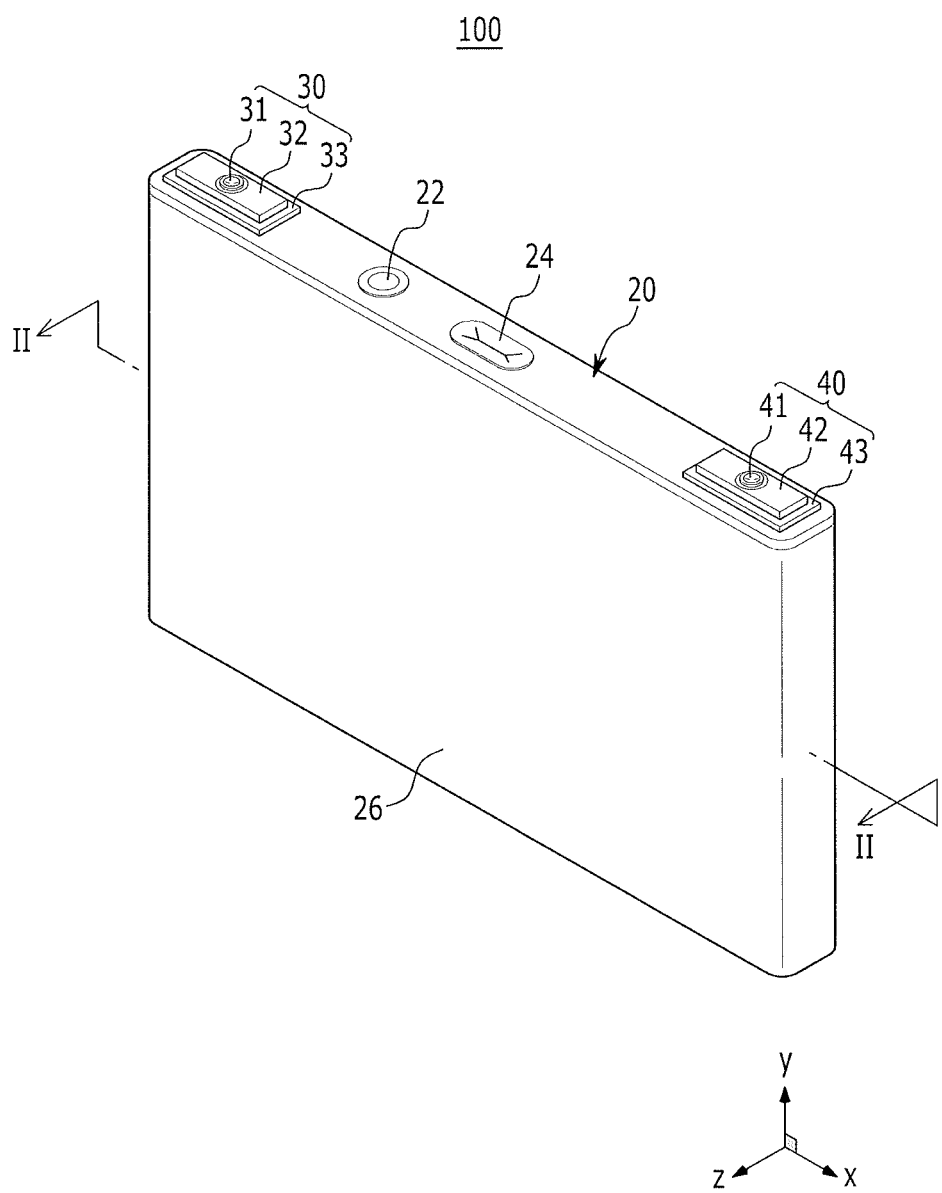
FIG. 1 illustrates a perspective view of a rechargeable battery, according to an exemplary embodiment.

Example embodiments will now be described more fully hereinafter with reference to the accompanying drawings; however, they may be embodied in different forms and should not be construed as limited to the embodiments set forth herein. In particular, as those skilled in the art would realize, the described embodiments may be modified in various different ways, all without departing from the spirit or scope of the present invention. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
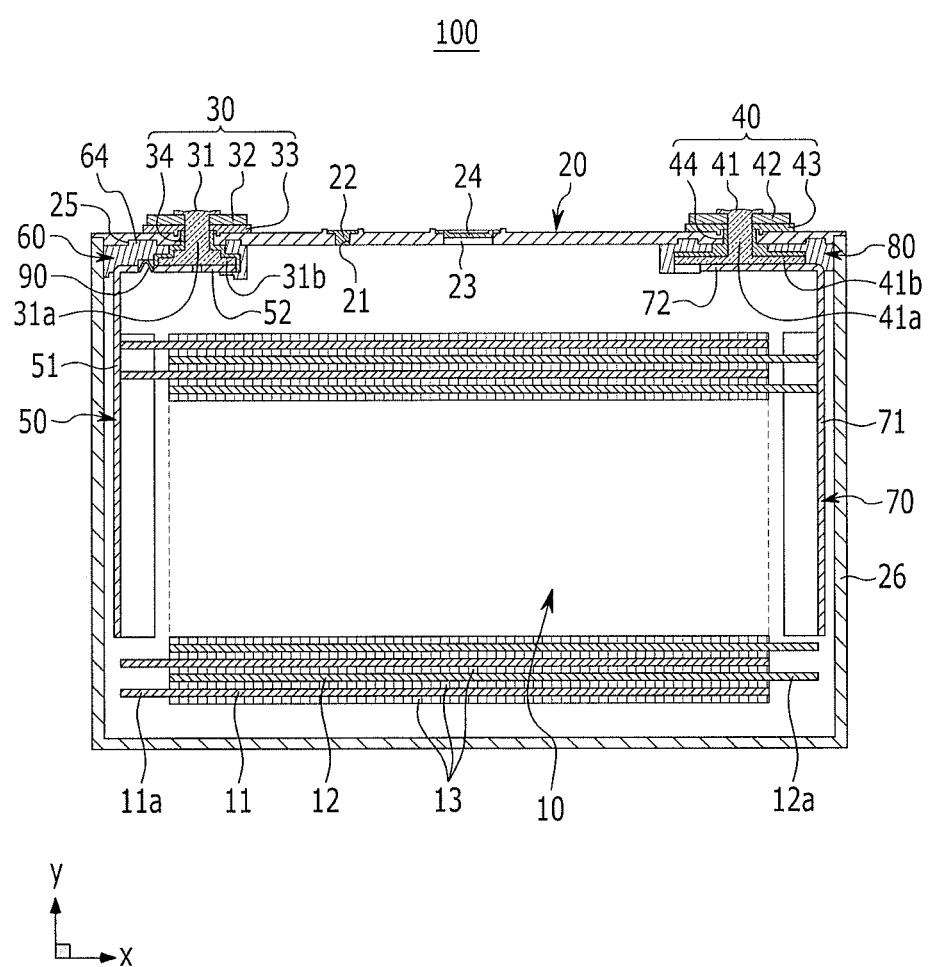
FIG. 2 illustrates a cross-sectional view taken along line II-II in FIG. 1.

FIG. 1 illustrates a perspective view of a rechargeable battery according to a exemplary embodiment, and FIG. 2 illustrates a cross-sectional view taken along line II-II of FIG. 1.

Referring to FIGS. 1 and 2, according to an exemplary embodiment, a battery 100, e.g., a rechargeable battery, may include at least one electrode assembly 10. The electrode assembly 10 may be formed by, e.g., winding a first electrode 11, a second electrode 12, and a separator 13 together to form a wound structure. The separator 13 may be disposed between the first electrode 11 and the second electrode 12 in the wound structure. The wound structure of the electrode assembly 10 may be embedded within a case 26 of the battery 100. A cap plate 20 may be coupled to an opening formed in the case 26. The cap plate 20 and the case 26 may together form a housing for the battery 100. A first terminal part 30 and a second terminal part 40 of the battery 100 may be electrically connected to the electrode assembly 10.

The first terminal part 30 may be connected via a first electrode current collecting member 50 to the first electrode 11 in the electrode assembly 10. The second terminal part 40 may be connected via a second electrode current collecting member 70 to the second electrode 12 in the electrode assembly 10. First and second insulating members 60 and 80 may be installed in the case 26, e.g., may be installed adjacent to the cap plate 20. The battery 100 may include an elastic structure 90 coupled to a fuse part, e.g., a fuse part 53 formed in at least one of the first and second electrode current collecting members 50 and 80. The elastic member 90 may be configured to provide an elastic force to the fuse part.

According to an exemplary embodiment, the battery 100 may be a lithium ion rechargeable battery. However, embodiments are not limited thereto, e.g., the battery 100 may be a lithium polymer battery or the like. Herein, a battery 100 having a rectangular shape will be described by way of example only. Embodiments are not limited thereto, e.g., the battery 100 may have various shapes such as a square shape or a cylindrical shape. According to an exemplary embodiment, the first electrode 11 may be a negative electrode and the second electrode 12 may be a positive electrode. However, embodiments are not limited thereto, e.g., the first electrode 11 may be a positive electrode and the second electrode 12 may be a negative electrode.

The electrode assembly 10 may be wound with the first electrode 11, the second electrode 12, and the separator 13 together to form, e.g., a jelly roll type structure electrode assembly. The first electrode 11 and the second electrode 12 may each include a current collector layer, e.g., formed of a thin metal foil, and an active material coated on a surface of the current collector layer. The first electrode 11 and the second electrode 12 may each be divided into a coated region and a non-coated region. In the coated regions of the first and second electrodes 11 and 12, the active material may be coated on the current collector layer. The uncoated regions, e.g., a first electrode uncoated region 11a on the first electrode 11 and a second electrode uncoated region 12a on the second electrode 12 may include only the current collector layer so that the active material is excluded in the uncoated regions. The coated regions may form substantial portions of the first electrode 11 and the second electrode 12 in the electrode assembly 10. The first electrode uncoated region 11a and the second uncoated region 12a may be disposed at sides, e.g., opposing sides, of the jelly roll structure.

Embodiments of the electrode assembly 10 are not limited to the jelly roll structure. For example, electrode assembly 10 may have a stacked structure in which, e.g., the first electrode 11 and the second electrode 12 are formed of a plurality of alternately stacked sheets and the separator 13 may be formed of sheets disposed between the sheets of the first electrode 11 and the second electrode 12.

The first electrode uncoated region 11a of the electrode assembly 10 may be electrically connected to the first terminal part 30 via the first electrode current collecting member 50. The second electrode uncoated region 12a may be electrically connected to the second terminal part 40 via the second electrode current collecting member 70. The first terminal part 30 may include a first electrode terminal of the battery 100. The second terminal part 40 may include a second electrode terminal of the battery 100. The first terminal part 30 and the second terminal part 40 may be disposed on opposing ends of the cap plate 20 and may be exposed to an outside of the battery 100 through the cap plate 20.

According to an exemplary embodiment, the battery 100 may have a rectangular shape so that the case 26 may have an approximately rectangular parallelepiped shape formed by sidewalls of the case 26. The case 26 may include an opened opening formed in one surface thereof, e.g., a top surface thereof. The cap plate 20 may be adjacent to the opened opening of the case 26 so that the cap plate 20 encloses the electrode assembly 10 within the case 26. However, embodiments are not limited thereto, e.g., the case 26 may have various shapes such as a cylindrical shape, a pouch shape, or the like.

The cap plate 26 may be formed of a thin plate that is coupled to the opening of the case 26. The cap plate 26 may seal the opening in the case 26. The cap plate 20 may be substantially perpendicular to sidewalls of the case 26. The cap plate 20 may include an electrolyte solution inlet 21 that, e.g., may be used to inject an electrolyte solution into the case 26. The electrolyte solution inlet 21 may be sealed by a sealing closure 22 after the electrolyte solution is injected into the case 26 to seal the case 26. The cap plate 20 may include a vent hole 23. The vent hole 23 may have mounted thereon a vent plate 24. The vent plate 24 may be fractured when, e.g., an internal pressure of the sealed case 26 reaches a set pressure or higher.

The first and second terminal parts 30 and 40 may include first and second rivets 31 and 41, respectively, that extend through openings in the cap plate 20. The first and second terminal parts 30 and 40 may include first and second terminal plates 32 and 42, respectively, surrounding the respective first and second rivets 31 and 41, on an outer surface of the cap plate 20. The first and second rivets 31 and 41 may include first and second pillar parts 31a and 41a, respectively, that extend through holes in the cap plate 20. The first and second rivets 31 and 41 may include first and second flange parts 31b and 41b, that are wider than the first and second pillar parts 31a and 41a, and extend outside the holes in the cap plate 20.

The first terminal part 30 may include a first terminal insulating member 33 surrounding the first rivet 31 and disposed between the first terminal plate 32 and the cap plate 20. The second terminal part 40 may include a conductive connection member 43 surrounding the second rivet 41 and disposed between the second terminal plate 42 and the cap plate 20. The first and second terminal parts 30 and 40 may include first and second gaskets 34 and 44 surrounding the first and second rivets 31 and 41, respectively, in through holes of the cap plate 20. According to an exemplary embodiment, the cap plate 20 may be electrically connected to the second terminal part 40 by the conductive connection member 43 so that the cap plate 20 may have the polarity of the positive electrode or the negative electrode. Alternatively, an insulating member instead of, e.g., the conductive connection member 43, may be also installed between the cap plate 20 and the second rivet 41. Therefore, the cap plate 20 may not be electrically connected to the second terminal part 40.

The first and second electrode current collecting members 50 and 70 may include first and second electrode coupling parts 51 and 71 and first and second terminal coupling parts 52 and 72, respectively. The first and second electrode coupling parts 51 and 71 may be coupled to and/or directly coupled to the first and second electrodes 11 and 12, e.g., ones of the first and second electrode uncoated regions 11a and 12a, respectively, of the electrode assembly 10. The first and second electrode coupling parts 51 and 71 may extend in a direction substantially parallel to the sidewalls of the case 26. The first and second terminal coupling parts 52 and 72 may be coupled to and/or directly coupled to the first and second terminal parts 30 and 40, e.g., the first and second rivets 31 and 41, respectively. The first and second terminal coupling parts 52 and 72 may extend in a direction substantially parallel to the cap plate 20. The elastic structure 90 made of, e.g., a material having elasticity, may be coupled to at least one of the first and second electrode current collecting members 50 and 70.

According to an exemplary embodiment, the structure of the first and second terminal parts 30 and 40 may be substantially the same, the structure of the first and second electrode current collecting members 50 and 70 may be substantially the same, and the structure of the first and second insulating members 60 and 80 may be substantially the same. However, embodiments are not limited thereto, e.g., the first terminal part and the first current collecting member 50 may be different structures than the second terminal part 40 and the second electrode current collecting member 70, respectively, to accommodate a fuse part and the elastic member 90.

According to an exemplary embodiment, the first terminal part 30 may include a cylinder shaped terminal rather than a plate type of terminal. As illustrated in FIG. 2, the first flange part 31b of the first terminal part 30 may have a stepped structure. The first insulating member 60 may have a corresponding stepped structure at the interface of the first flange part 31b and the first insulating member 60. The second flange part 41b of the second terminal part 41 may have a flat plate type structure. The second insulating member 80 may have a different shape to correspond to the plate type structure of the second flange part 41b.

Figure 3:
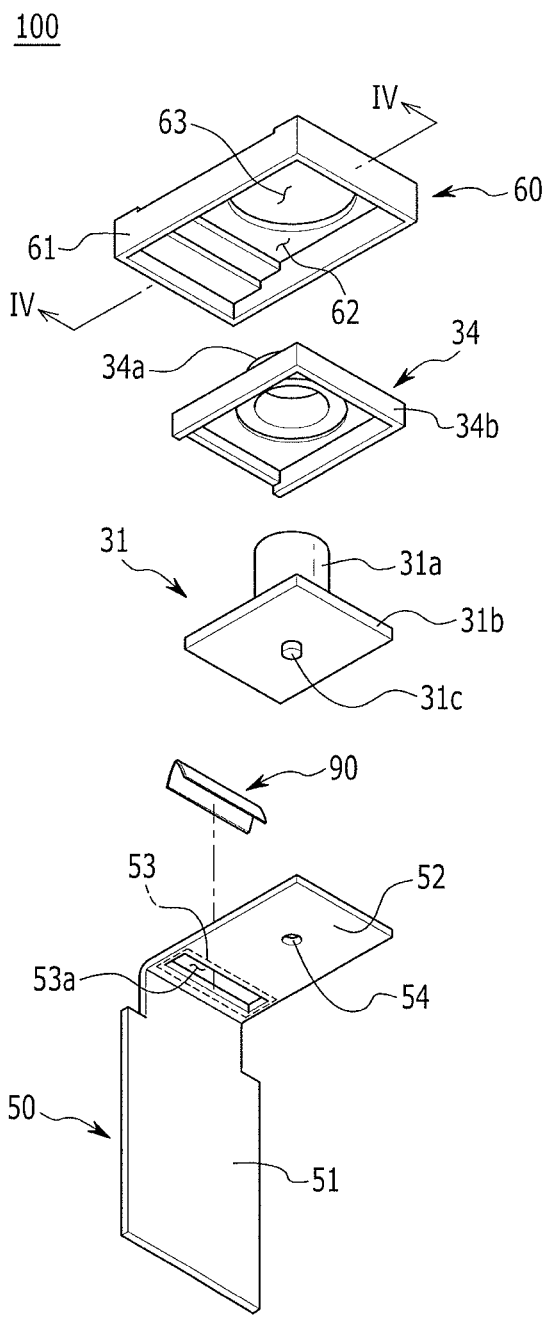
FIG. 3 illustrates a partially exploded perspective view of a rechargeable battery, according to an exemplary embodiment.
Figure 4:
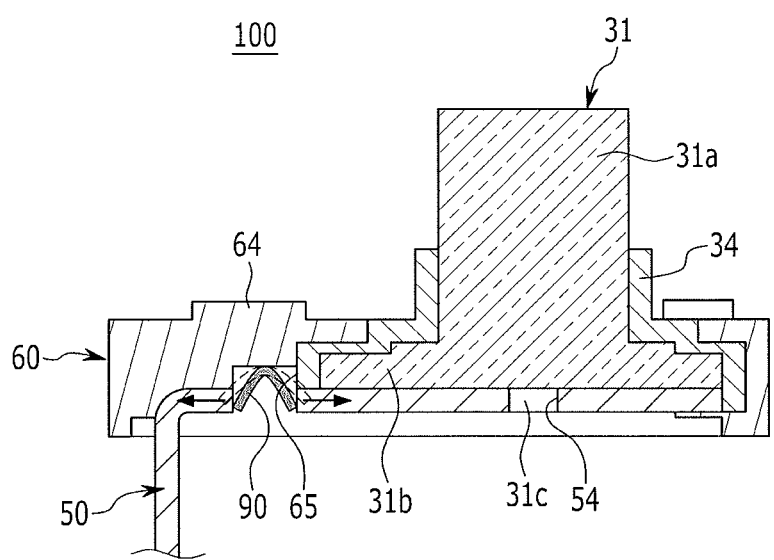
FIG. 4 illustrates a cross-sectional view taken along line IV-IV in FIG. 3.

FIG. 3 illustrates a partially exploded perspective view of a battery according to an exemplary embodiment, and FIG. 4 illustrates a cross-sectional view taken along line IV-IV of FIG. 3.

Referring to FIGS. 3 and 4, the first rivet 31 may include the pillar part 31a, the rivet flange part 31b connected to the pillar part 31a, and a protrusion 31c formed on the rivet flange part 31b. The first gasket 34 may include a body 34a having a through-hole formed therein. The through-hole may be formed to accommodate the pillar part 31a of the first rivet 31. The first gasket 34 may include a gasket flange part 34b, e.g., extending from the body 34a. The gasket flange part 34b may be formed to surround the rivet flange part 31b of the first rivet 31, e.g., the gasket flange part 34b may have a structure corresponding to a structure of the rivet flange part 31b. For example, both the rivet flange part 31b and the gasket flange part 34b may have a stepped structure.

The first insulating member 60 according may include a body 61, a coupling groove 62, and a through-hole 63. The body 61 may have a complimentary structure to the structures of the gasket flange part 34b and the rivet flange part 31b. The through-hole 63 may have the first rivet 31, e.g., the pillar part 31a, penetrating therethrough and the body 34a of the gasket 34. The first insulating member 60 may have at least one fixing protrusion 64, e.g., as illustrated in FIG. 2, that is used to fix the first insulating member 60 to the cap plate 20. For example, the cap plate 20 may have at least one protrusion groove 25 formed in the cap plate 20 that corresponds to the fixing protrusions 64.

The first electrode current collecting member 50 may include the first electrode coupling part 51 coupled to the first electrode 11, e.g., extending in a direction parallel to sidewalls of the case 26, and the first terminal coupling part 52, e.g., under the first rivet 31. The first electrode current collecting member 50 may include the first terminal coupling part 52 bent from the first electrode coupling part 51. For example, the first terminal coupling part 52 may be substantially perpendicular to the first electrode coupling part 51.

As illustrated in FIG. 4, the first gasket 34 may be inserted through the coupling groove 62 of the first insulating member 60. The pillar part 31a of the first rivet 31 may be inserted through the through-hole 63 of the first insulating member 60 while penetrating through the body 34a of the first gasket 34 having the through-hole formed therein. The gasket 34 may be between the first insulating member 34 and the first rivet 31.

According to an exemplary embodiment, the first terminal coupling part 52 may be provided with a rivet coupling groove 54 and a fuse part 53. The protrusion 31c formed in the first rivet 31 may be inserted into the rivet coupling groove 54 of the first electrode current collecting member 50. The protrusion 31c may be coupled to the rivet coupling groove 54 in a press-fitting scheme or may be inserted into the rivet coupling groove 54 and then fixed thereto using, e.g., a welding process. The first electrode current collecting member 50 may be inserted into the coupling groove 62 of the first insulating member 60.

The fuse part 53 of the first terminal coupling part 52 may include a fuse hole 53a. The fuse hole 53a may form a portion, e.g., a central portion, of the fuse part 53. The first terminal coupling part 52 of the first electrode current collecting member 50 may be provided with the fuse part 53 so that the fuse part 53 may be fractured or melted when, e.g., overcurrent occurs in the rechargeable battery 100. Therefore, the fuse part 53 may have an untriggered condition, i.e., during normal operation, or a triggered condition, i.e., after being activated by an operation such as fracturing or melting of the fuse part 53.

According to an exemplary embodiment, the fuse part 53 including the fuse hole 53a may be formed in a portion of the first terminal coupling part 52. Therefore, the portion of the first terminal coupling part 52 in which the fuse part 53 is formed may have a cross section area smaller than those of other portions of the first terminal coupling part 52 in which the fuse part 53 is not formed. The fuse part 53 may constitute a narrow region of the first terminal coupling part 52 of the first electrode current collecting member 50. The fuse hole 53a may be at least partially defined by the narrow region of the first electrode current collecting member 50. The fuse part 53 may surround, e.g., completely surround, the fuse hole 53a. A length of the fuse hole 53a may be greater than a width of the fuse hole 53a, e.g., the fuse hole 53a may have a rectangular shape extending across a cross-section of the first electrode current collecting member 50.

When the overcurrent occurs in the rechargeable battery 100, e.g., when the fuse part 53 is changed from the untriggered condition to the triggered condition, the fuse part 53 having the cross sectional area that is smaller than cross sectional areas of other portions of the first terminal coupling part 52 may be melted or fractured by the overcurrent. As such, the triggered condition of the fuse part 53 may be imparted and flow of the current in the rechargeable battery 100 may be blocked.

The elastic structure 90 made of, e.g., a material having elasticity, may be installed in the fuse hole 53a of the fuse part 53. The elastic structure 90 may be configured to apply elastic force. Hereinafter, an exemplary embodiment in which the elastic structure 90 is configured to act to apply elastic force on the fuse part 53 will be described in detail.

According to an exemplary embodiment, the elastic structure 90 may have at least two configurations, e.g., a first configuration and a second configuration. The elastic structure 90 may have the first configuration when the fuse part 53 is in the untriggered condition. The elastic structure 90 may have the second configuration when the fuse part 53 is in the triggered condition. The elastic structure 90 may be formed by bending a plate, e.g., an elastic plate, having a predetermined thickness. The plate may be made of an elastic material. The plate may be bent at a predetermined angle, e.g., based on a central portion of the plate, to form the first configuration of the elastic structure 90.

According to the exemplary embodiment, end portions of the elastic structure 90 may contact opposing surfaces of the fuse hole 53a. For example, when the fuse part 53 is in the untriggered condition, a lower portion of the elastic structure 90 in the first configuration may be disposed in the fuse hole 53a. A central portion of the elastic structure 90, e.g., a bent portion of the elastic structure 90, may be disposed in an elastic structure coupling groove 65 in the first insulating member 60.

The elastic structure coupling groove 65 in the first insulating member 60 may overlap, e.g., substantially completely overlap, the fuse hole 53a. An area of the elastic structure coupling groove 65 may correspond to an area of the fuse hole 53a. The elastic structure coupling groove 65 may be formed to accommodate the central portion of the elastic structure 90.

When the elastic structure 90 is disposed in the fuse hole 53a, e.g., in the untriggered condition of the fuse part 53 and/or the untriggered condition of the fuse part 53, the elastic force of the elastic structure 90 may act in directions toward the outside of the fuse hole 53a, e.g., the arrow directions of FIG. 4). The elastic structure 90 may be configured to provide elastic force to the sidewalls defining the fuse hole 53a in, e.g., the first terminal coupling part 52.

When the fuse part 53 is partially melted or fractured to form the triggered condition, e.g., due to the generation of the overcurrent in the rechargeable battery 100, or when fractured surfaces of the fuse part 53 are excessively close to each other in the triggered condition, an abnormal phenomenon such as arc generation between the fractured surfaces, or the like, may occur. In contrast, according to an exemplary embodiment, the elastic structure 90 may maintain distance between the fractured surfaces of the fuse part 53. For example, the elastic structure 90 may reduce the possibility of an abnormal phenomenon such as the arc generation, or the like.

When the elastic structure 90 changes from, e.g., the first configuration to the second configuration, the elastic structure 90 may be restored to its shape before it was inserted into the fuse hole 53a (see, e.g., the elastic structure 90 shown in a broken line in FIG. 4). The first configuration may constitute a compressed shape of the elastic structure 90. The second configuration may constitute an expanded shape, i.e., non-compressed shape, of the elastic structure 90.

For example, in the first configuration, the elastic structure 90 may be bent at a first predetermined angle. In the second configuration, the elastic structure 90 may be bent at a second predetermined angle. The second predetermined angle of the elastic structure 90 in the second configuration may be greater than the first predetermined angle. In the first configuration, lateral ends of the elastic structure 90 may be spaced apart by a first distance, e.g., the lateral ends may be spaced apart by the first distance in the fuse hole 53a or below the fuse hole 53a. In the second configuration, the lateral ends of the elastic structure 90 may be spaced apart by a second distance, e.g., the lateral ends may be spaced apart by the second distance in an area adjacent to the fuse hole 53a. The second distance may be greater than the first distance.

As the elastic structure changes configurations, the elastic force of the elastic structure 90 may act in directions toward the outside of the fuse hole (the arrow directions of FIG. 4). Accordingly, a distance may be maintained between fractured surfaces of the fuse part 53, e.g., so that the fractured surfaces may not be electrically connected to each other in the triggered condition of the fuse part 53.

According to an exemplary embodiment, a size of the fuse hole 53a formed in the fuse part 53 may be freely designed, e.g., without being limited by a strength of the first electrode current collecting member 50 or a size of a cross section area of the fuse part 53. As such, a degree of freedom in design of the fuse part 53 may be increased.

Although the exemplary embodiment describes a case in which the fuse part 53 having the fuse hole 53a formed therein may be formed in the first electrode current collecting member 50, embodiment are not limited thereto. For example, the fuse part having the fuse hole formed therein may be formed in the second electrode current collecting member 70. In this case, an elastic structure having substantially the same or similar configuration as that of the elastic structure 90 may be coupled to a fuse hole in a fuse part of the second electrode current collecting member 70.

Although the exemplary embodiment describes the elastic structure 90 as being inserted into the fuse hole 53a, embodiments are not limited thereto. For example, the elastic structure 90 may be installed so that the fuse hole 53a contact another portion of the fuse part 53, thereby allowing elastic force to act on the fuse part 53.

Figure 5A:
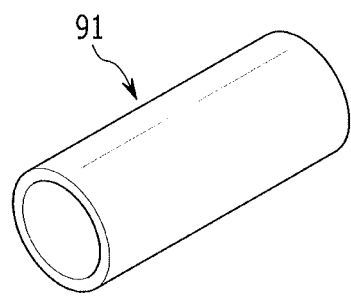
FIGS. 5A and 5B illustrate perspective views of exemplary elastic structures, according to exemplary embodiments.
Figure 5B:
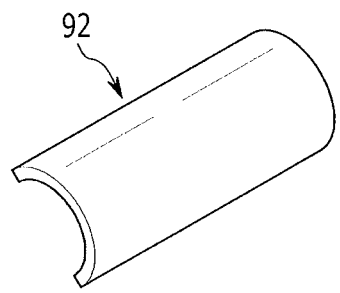

FIGS. 5A and 5B illustrate perspective views of modified exemplary embodiments of elastic structures.

Referring to FIG. 5A, an elastic structure 91 may have a cylindrical shape in which a hollow part is formed. According to an exemplary embodiment, the elastic structure 91 may be inserted into the fuse hole 53a illustrated in FIG. 3. In a first configuration, e.g., when the fuse part 53 is in an untriggered condition, the elastic structure 91 may have a compressed shape. In a second configuration, e.g., when the fuse part 53 is in a triggered condition, the elastic structure 91 may have an expanded shape. The expanded shape of the elastic structure 91 may correspond to the cylindrical shape illustrated in FIG. 5A.

Referring to FIG. 5B, the elastic structure 92 have a semi-cylindrical shape, e.g., the semi-cylindrical shape may correspond to a shape formed by cutting in half the cylindrical shaped elastic structure 91 in which a hollow part is formed. According to an exemplary embodiment, the elastic structure 92 may be inserted into the fuse hole 53a illustrated in FIG. 3. In a first configuration, e.g., when the fuse part 53 is in an untriggered condition, lateral ends of the elastic structure 92 may be spaced apart by a first distance. In a second configuration, e.g., when the fuse part 53 is in a triggered condition, the lateral ends of the elastic structure 92 may be spaced apart by a second distance that is greater than the first distance.

Shapes of the elastic structures 90, 91, and 92 are not limited to bent shape, a cylindrical shape, or a semi-cylindrical shape. The elastic structures may have any shape as long as elastic force may act, e.g., in directions toward the outside of the fuse hole 53a (the arrow direction of FIG. 4). For example, the elastic structure may have a cross section having a triangular shape, a rectangular shape, or the like.

Figure 7:
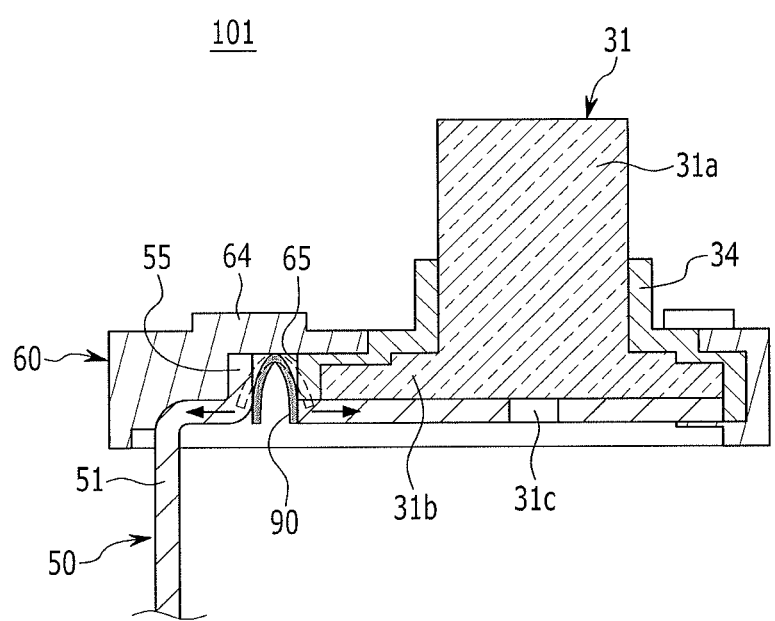
FIG. 7 illustrates a cross-sectional view taken along line VII-VII in FIG. 6.

FIG. 6 illustrates a partially exploded perspective view of a battery according to another exemplary embodiment, and FIG. 7 illustrates a cross-sectional view taken along line VII-VII of FIG. 6.

A battery 101, according to the exemplary embodiment, may have substantially the same or similar configuration as that of the battery 100, e.g., except the first electrode current collecting member 50 may be modified. Accordingly, a description of the like elements will be omitted below.

Referring to FIGS. 6 and 7, according to an exemplary embodiment, the first electrode current collecting member 50 may include a support protrusion 55. The support protrusion may be formed to protrude from one sidewall defining the fuse hole 53a of the fuse part 53, e.g., the support protrusion 55 may by formed on a peripheral edge of the fuse hole 53a.

When the elastic structure 90 is inserted into the fuse hole 53a, one surface of the elastic structure 90 may be supported by the support protrusion 55. A height of the support protrusion 55 may correspond to a height of the one surface of the elastic structure 90. The support protrusion may be integrally formed with the fuse part 53 and/or the first current collecting member 50. The support protrusion 55 may act in a direction opposite to a direction in which the elastic force of the elastic structure 90 acts. According to an exemplary embodiment, when the fuse part 53 is melted or fractured, the elastic force may be transferred through the support protrusion 55 in a direction toward the outside of the fuse hole 53a (an arrow direction of FIG. 7).

For example, when the elastic structure 90 is restored to its shape before it was inserted into the fuse hole 53a (see the elastic structure 90 shown in a broken line in FIG. 7), e.g., the second configuration of the elastic structure 90, the elastic force of the elastic structure 90 may act in directions toward the outside of the fuse hole (the arrow direction of FIG. 7). Accordingly, in the second configuration, a contact area between the support protrusion 55 and the elastic structure 90 may be increased. As such, the elastic force of the elastic structure 90 may be effectively transferred to the fuse part 53. Therefore, a distance between fractured surfaces of the fuse part 53 may be sufficiently maintained when the fuse part 53 is in the triggered condition, e.g., so that a possibility of the occurrence of an abnormal phenomenon such as the arc generation, or the like, may be reduced and/or prevented.

Embodiments of support protrusion 55 are not limited to being formed to protrude only from a periphery of the fuse hole 53a. For example, the support protrusion 55 may be formed to protrude from both opposing sidewalls of the fuse hole 53a.

Figure 8:
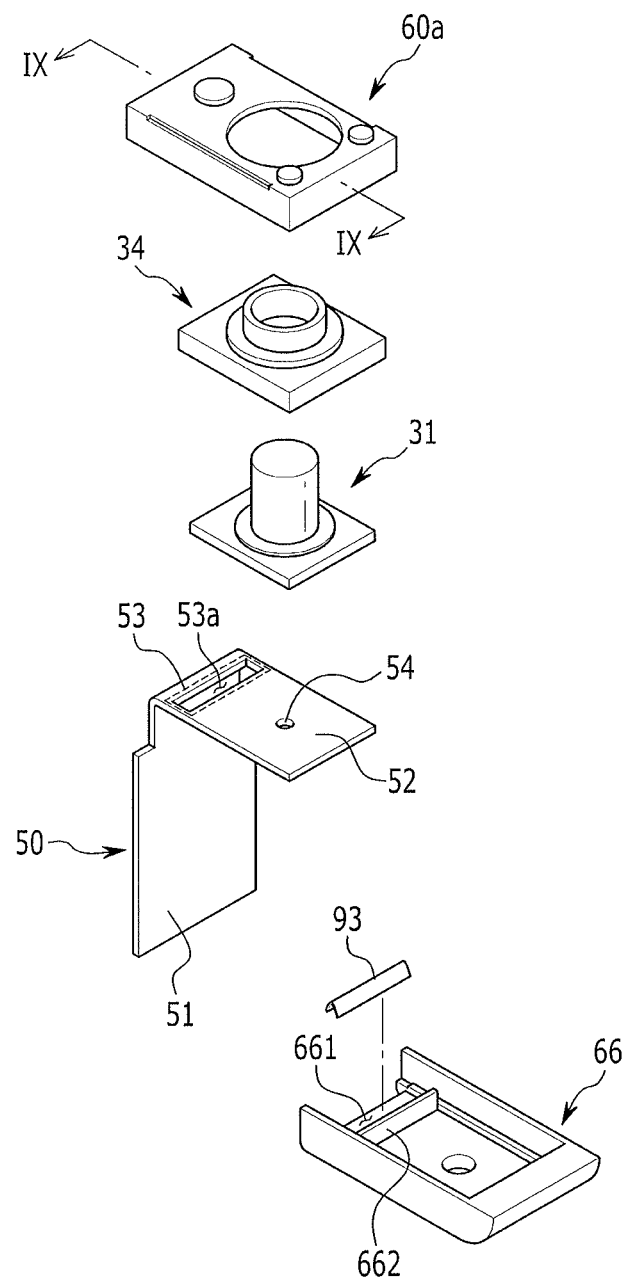
FIG. 8 illustrates a partially exploded perspective view of a rechargeable battery, according to an exemplary embodiment.
Figure 9:
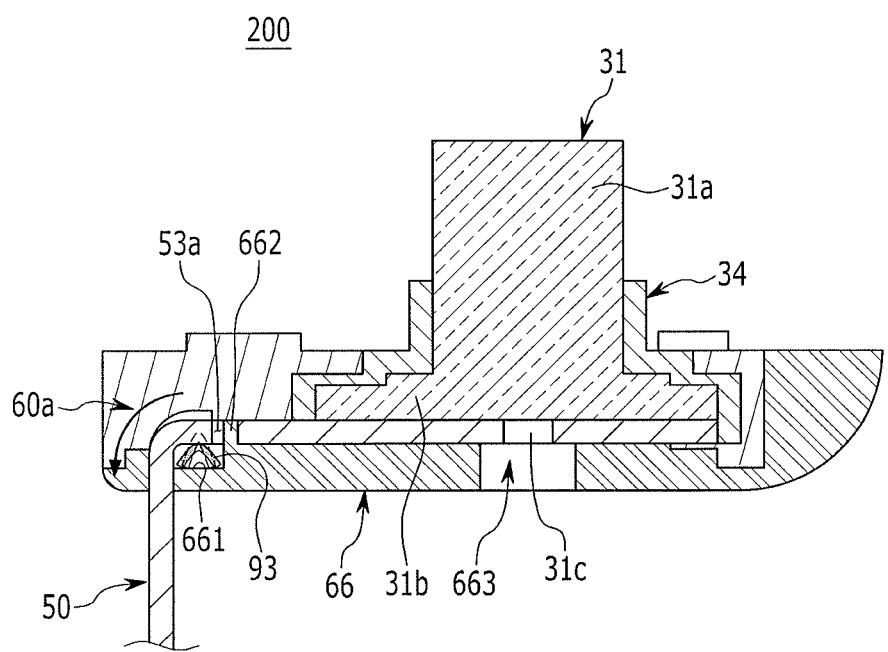
FIG. 9 illustrates a cross-sectional view taken along line IX-IX in FIG. 8.

FIG. 8 illustrates a partially exploded perspective view of a battery according to an exemplary embodiment, and FIG. 9 illustrates a cross-sectional view taken along line IX-IX of FIG. 8.

A battery 200, according to the exemplary embodiment, may have substantially the same or similar configuration as that of the battery 100, e.g., except the battery may include an additional member. For example, the battery 200 may include a first insulating layer supporting member 66. The supporting member 66 may be adjacent to a first insulating member 60a and an elastic structure 93. A description of the like elements will be omitted below.

Referring to FIGS. 8 and 9, the battery 200 may include the elastic structure 93, which may be substantially the same as or similar to the elastic structure 90. The elastic structure 93 may be inserted into the supporting member 66 so that the elastic structure 93 is between, e.g., enclosed by, the first insulating layer supporting member 66 and the first electrode current collecting member 50. The elastic structure 93 may be adjacent to the fuse hole 53a; however, the elastic structure 93 may not be disposed within the fuse hole 53a. The elastic structure 93 may be formed by bending a plate, e.g., an elastic plate, having a predetermined thickness at a predetermined angle at a central portion thereof. The elastic structure 93 may be made of an elastic material based.

The battery 200 may include the supporting member 66 coupled to the first insulating member 60a. The first insulating member 60a, according to the exemplary embodiment, may have substantially the same configuration as that of the first insulating member 60 except that the elastic structure coupling groove 65 may not be formed in the first insulating member 60a. However, the first insulating member 60a may include a groove for accommodating a portion of the supporting member 66. A description of the like elements will be omitted below.

The first insulating layer supporting member 66 according to the exemplary embodiment may include an elastic structure coupling hole 661, e.g., the elastic structure 93 may be seated inside the elastic structure coupling hole 661. A portion of the first electrode current collecting member 50 and the fuse hole 53a may overlap the elastic structure coupling hole 661. The supporting member 66 may include a coupling protrusion 662. The coupling protrusion 662 may extend through a via hole in the current collecting member 50. The via hole may be spaced apart from the fuse hole 53a in the current collecting member 50. Alternatively, the coupling protrusion 662 formed in the first lower insulating member supporting member 66 may be inserted into the fuse hole 53a. The coupling protrusion 662 may extend to the groove in the first insulating member 60a for accommodating a portion of the supporting member 66. The groove in the first insulating member 60a may be formed to engage the coupling protrusion 662 so that the first insulating member 60a may be fixed and/or coupled to the supporting member 66 via the coupling protrusion 662.

The supporting member 66 may include a gas discharging hole 663. The first rivet 31 may overlap the gas discharging hole 663, e.g., the protrusion 31c may overlap the gas discharging hole 663. The supporting member 66 may also have, e.g., a stepped structure, to accommodate a lateral end of the first insulating member 60a that includes a corresponding stepped structure.

The elastic structure 93 may be inserted into the elastic structure coupling hole 661 and may be positioned between the supporting member 66 and the first electrode current collecting member 50. The elastic structure 93 may be spaced apart from the fuse hole 53a the elastic structure 93.

A coupling relationship between the elastic structure 93, according to the exemplary embodiment, and the first electrode current collecting member 50 will be described in more detail. A bent portion of the elastic structure 93 may be installed to be closely adhered to the first electrode current collecting member 50 adjacent to a portion in which the fuse part 53 is formed.

According to an exemplary embodiment, when the fuse part 53 is melted or fractured due to, e.g., the generation of the overcurrent in the battery 200, a portion of the first electrode current collecting member 50 may move by the elastic force generated in the elastic structure 93 in, e.g., a counterclockwise direction (an arrow direction of FIG. 9). For example, the elastic force from the elastic structure 93 may cause counterclockwise movement of a portion of the first electrode current collecting member 50 adjacent to the elastic structure 93.

When the elastic structure 93 is restored to its shape before it was inserted into the elastic structure coupling hole 661 (see the elastic structure 93 shown in a broken line in FIG. 9), e.g., when the fuse part 53 is in the triggered condition, the elastic force of the elastic structure 90 may act in the direction toward the outside of the fuse hole (the arrow direction of FIG. 9). For example, when the fuse part 53 is in the triggered condition, the elastic structure 93 may act to apply elastic force to the fuse hole 53a that is disposed above the elastic structure 93.

The elastic structure 93 may be changeable from a first configuration, e.g., when the fuse part 53 is in the untriggered condition, to a second configuration, e.g., when the fuse part 53 is in the triggered condition. In the first configuration, the elastic member 93 may be in a compressed stated. In the second configuration, the elastic member 93 may be in an expanded state, i.e., a non-compressed state.

For example, in the first configuration, the elastic member 93 may be bent at a first predetermined angle. In the second configuration, the elastic member 93 may be bent at a second predetermined angle, and the second predetermined angle may be less than the first predetermined angle. The elastic structure 93 in the first configuration may have a first height and the elastic structure 93 in the second configuration may have a second height. The second height may be greater than the first height. As illustrated in FIG. 9, in the first configuration, lateral ends of the elastic structure 93 may be spaced apart by a first distance. In the second configuration, lateral ends of the elastic structure 93 may be spaced apart by a second distance and the second distance may be less than the first distance.

According to an exemplary embodiment, to the coupling protrusion 662 may reduce the possibility of and/or prevent electrical connection between the fractured surfaces formed after the fuse part 53 is melted or fractured. Gas generated in the melted or fractured fuse part 53 may be discharged through the gas discharging hole 663 formed in the supporting member 66. A distance between the fractured surfaces of the fuse part 53 formed due to, e.g., the overcurrent, may be sufficiently maintained so that the abnormal phenomenon such as the arc generation, or the like, may not occur. Further, gas generated in the first insulating member 60a may be effectively discharged.

A size of the fuse hole 53a formed in the fuse part 53 may be freely designed, e.g., without being limited by strength of the first electrode current collecting member 50 or a size of a cross section area of the fuse part 53. Accordingly, a degree of freedom in design of the fuse part 53 may be increased.

A shape of the elastic structure is not limited to a shape of the elastic structure 93. For example, the elastic structure may have any shape capable of generating the elastic force. The elastic structure may have a cross section having a circular shape, a semi-circular shape, a triangular shape, and the like, Although the exemplary embodiment describes a case in which the fuse part 53 having the fuse hole 53a formed therein is formed in the first electrode current collecting member 50, a fuse part having a fuse hole formed therein may be foamed in the second electrode current collecting member 70. In this configuration, an elastic structure having substantially the same configuration as that of, e.g., the elastic structure 93, may be coupled to the fuse part of the second electrode current collecting member 70.

Figure 10:
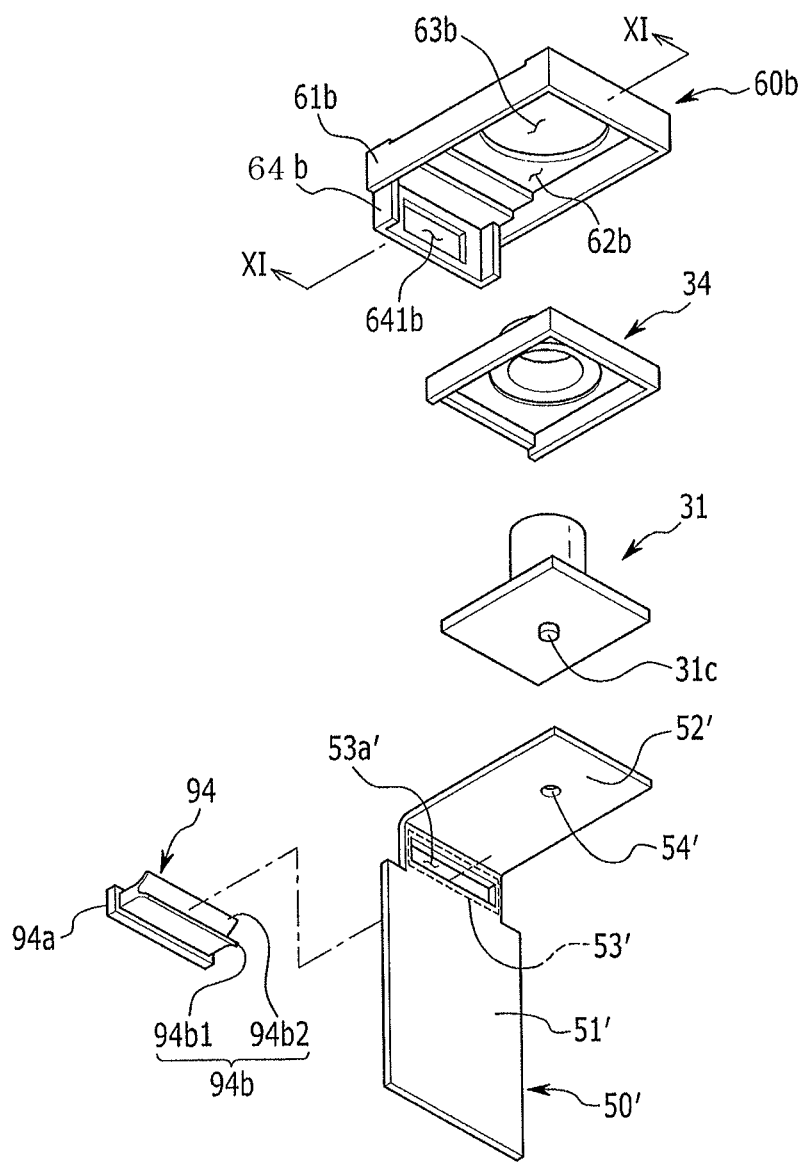
FIG. 10 illustrates a partially exploded perspective view of a rechargeable battery, according to an exemplary embodiment.
Figure 11:
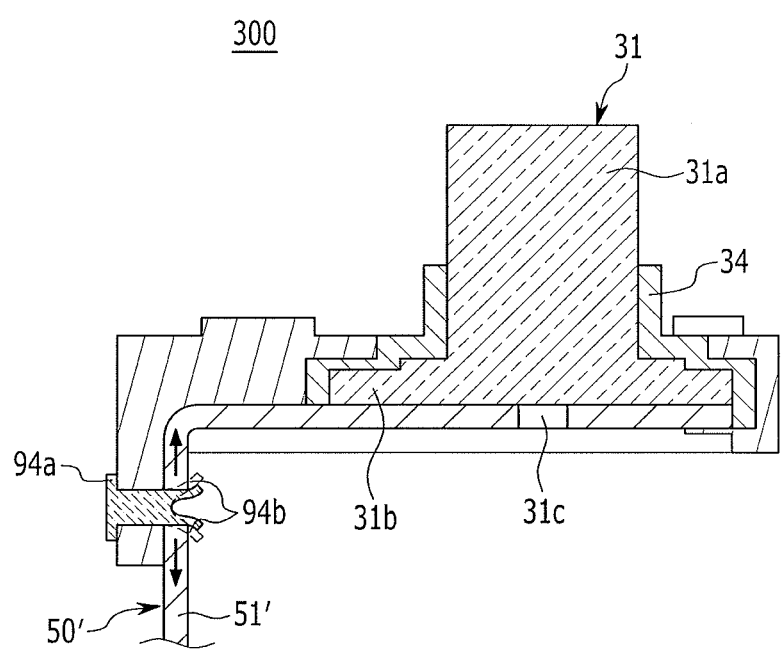
FIG. 11 illustrates a cross-sectional view taken along line XI-XI in FIG. 10.

FIG. 10 illustrates a partially exploded perspective view of a battery according to an exemplary embodiment, and FIG. 11 illustrates a cross-sectional view taken along line XI-XI of FIG. 10.

The battery 300, according to the exemplary embodiment, may have substantially the same or similar configuration as that of the rechargeable battery 100, e.g., except for a first electrode current collecting member 50', a first insulating member 60b, and an elastic structure 94. The first insulating member 60b, according to the exemplary embodiment, may have substantially a same or similar configuration as that of the first insulating member 60, e.g., except for a lower protruding part 64b. Accordingly, a description of the like elements will be omitted below.

Referring to FIGS. 10 and 11, the first electrode current collecting member 50' may include a first electrode coupling part 51' coupled to the first electrode 11 and a first terminal coupling part 52'. The first electrode coupling part 51' may be formed to be extended from one side end of the first terminal coupling part 52' in a direction approximately perpendicular to the first terminal coupling part 52'. The first electrode coupling part 51' of the first electrode current collecting member 50' may be provided with the fuse part 53'. The fuse part 53' may be melted or fractured when, e.g., the overcurrent occurs in the battery 300. The fuse part 53' may include a fuse hole 53a'.

The first insulating member 60b, according to an exemplary embodiment, may include the lower protruding part 64b formed extended from one side thereof in a direction toward the electrode assembly 10. The lower protruding part 64b may be adjacent to the first electrode coupling part 51' of the first electrode current collecting member 50'. The lower protruding part 64b may be disposed between the case 26 and the first electrode current collecting member 50'. The first insulating member 60b may also include a body 61b, a coupling grove 62b, and a through-hole 63b.

The elastic structure 94, according to the exemplary embodiment, may include a body 94a and a fuse hole coupling part 94b. The fuse hole coupling part 94b may extend from the body 94a. At least one of the fuse hole coupling part 94b and the body 94a may be made of an elastic material. The fuse hole coupling part 94b and the body 94a may be integrally formed. The fuse hole coupling part 94b may include a pair of elastic branches 94b1 and 94b2 formed on one end of the body part 94a. Lateral ends of elastic branches 94b1 and 94b2 may be spaced apart from each other in first and second configurations of the elastic structure 94.

The lower protruding part 64b of the first insulating member 60b may include an elastic structure coupling hole 641b formed therein. The pair of elastic branches 94b1 and 94b2 may be inserted into the fuse hole 53a' after the body 94a of the elastic structure 94 is coupled to the elastic structure coupling hole 641b formed in the lower protruding part 64b. Elastic forces generated by the pair of elastic branches 94b1 and 94b2 may act on opposing surfaces of the fuse hole 53a'. Lateral ends of the elastic branches 94b1 and 94b2 may be disposed outside the fuse hole 53a' to an area including the electrode assembly 10. Accordingly, the branches 94b1 and 94b2 may extend through the fuse hole 53a' to the area including the electrode assembly 10.

When the overcurrent occurs in the rechargeable battery 300, the fuse part 53' may be melted or fractured to form the triggered condition of the fuse part 53'. The elastic force generated by the pair of elastic branches 94b1 and 94b2 of the elastic structure 94, when the fuse part 53' is in the triggered condition, may act in a direction toward the outside of the fuse hole 53a' (the arrows directions of FIG. 11). Accordingly, a distance between fractured surfaces of the fuse part 53' formed due to, e.g., the overcurrent, may be sufficiently maintained so that the possibility of an abnormal phenomenon such as the arc generation, or the like, may be reduced and/or prevented.

The pair of elastic branches 94b1 and 94b2 of the elastic structure 94 may have a first configuration when the fuse part 53' is in an untriggered condition and a second configuration when the fuse part 53' is in the triggered condition. In the first configuration, the elastic branches 94b1 and 94b2 may be spaced apart by a first distance, and in the second configuration, the elastic branches 94b1 and 94b2 may be spaced apart by a second distance. The second distance may be greater than the first distance.

According to an exemplary embodiment, the first electrode coupling part 51' may be formed to be bent in a direction approximately perpendicular to the first terminal coupling part 52'. Therefore, in the case in which the fuse part 53' is formed in the first electrode coupling part 51' as in the exemplary embodiment, when the fuse part 53' is melted or fractured, the elastic branches 94b1 and 94b2 of the elastic structure 94 may serve to separate, e.g., completely separate, the first electrode coupling part 51' and the first terminal coupling part 52' from each other.

A degree of freedom in design of the fuse part 53' may increase without, e.g., being limited by a material of the first electrode current collecting member 50' or a size or a position of the fuse part 53', or the like. The structure of the elastic branches 94b1 and 94b2 of the elastic structure 94 is not limited to the shape according to the exemplary embodiment. For example, the elastic branches 94b1 and 94b2 may have any shape that will allow the elastic force to act on the fuse hole 53'. A portion of the elastic branches 94b1 and 94b2 inserted into and/or through the fuse hole 53a' may have a circular shape, an oval shape, a triangular shape, or the like.

Although the exemplary embodiment describes a case in which the fuse part 53' having the fuse hole 53a' formed therein is formed in the first electrode current collecting member 50', a fuse part having the fuse hole formed therein may also be formed in the second electrode current collecting member 70. In this configuration, an elastic structure having substantially the same or similar configuration as that of the elastic structure 94 may be coupled to the fuse part of the second electrode current collecting member 70.

Figure 12:
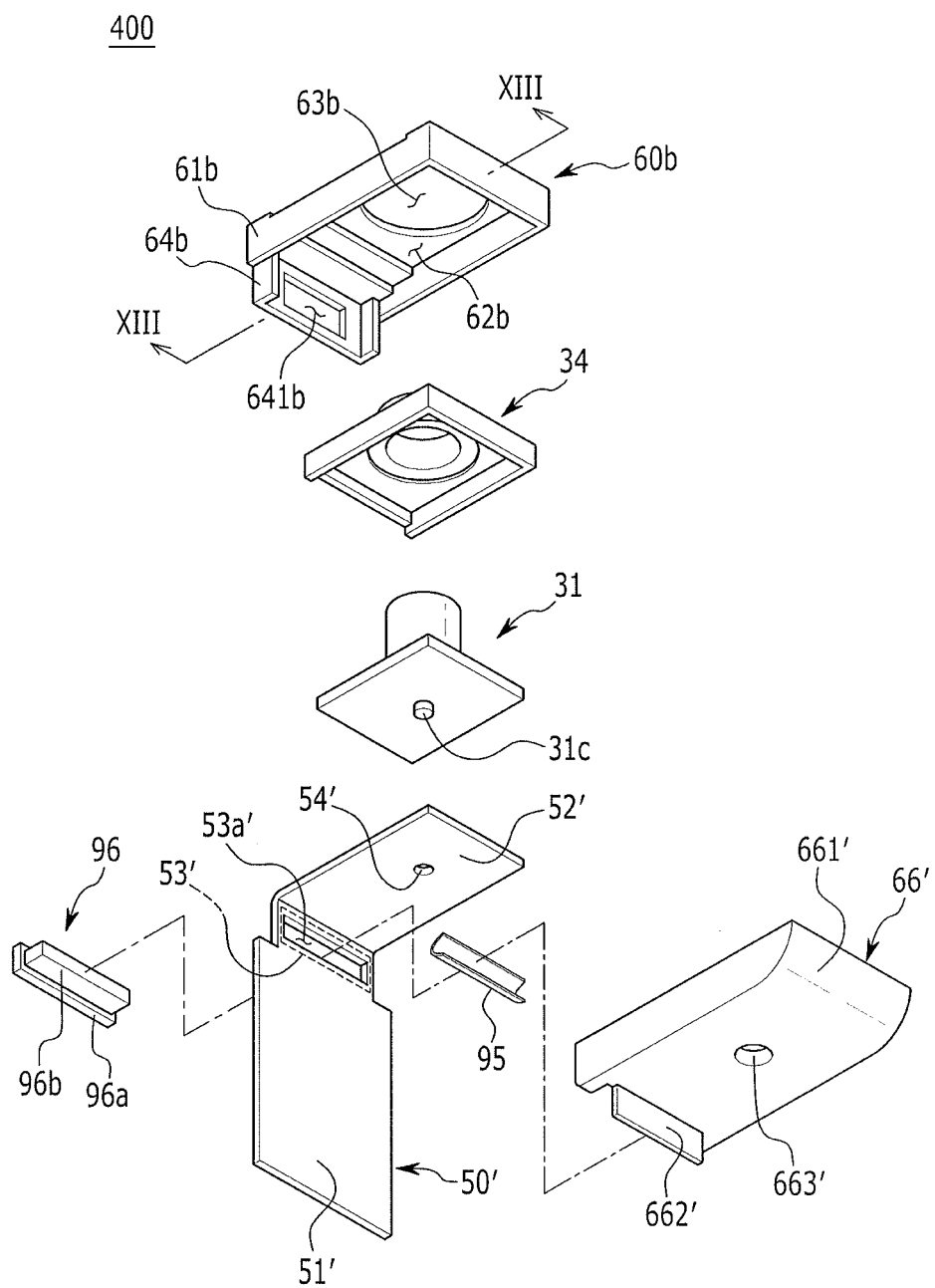
FIG. 12 illustrates a partially exploded perspective view of a rechargeable battery, according to an exemplary embodiment.
Figure 13:
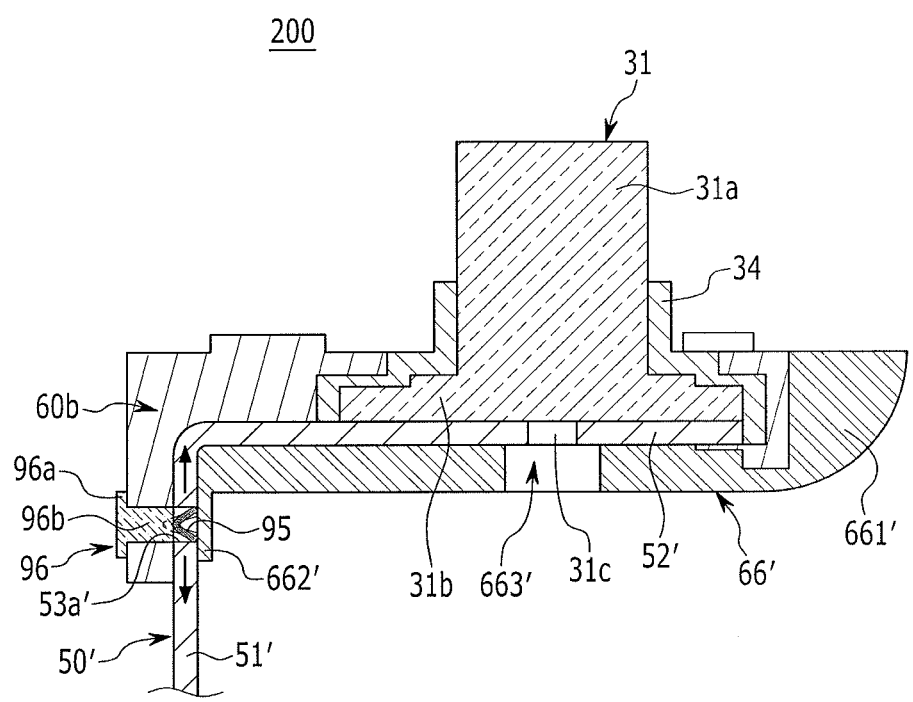
FIG. 13 illustrates a cross-sectional view taken along line XIII-XIII in FIG. 12.

FIG. 12 illustrates a partially exploded perspective view of a rechargeable battery according to another exemplary embodiment, and FIG. 13 illustrates a cross-sectional view taken along line XIII-XIII of FIG. 12.

The battery 400 according to the exemplary embodiment has substantially the same or similar configuration as that of the battery 300, e.g., except for including a first insulating member supporting member 66', an elastic structure 95, and an elastic structure fixing member 96. Accordingly, a description of the like elements will be omitted below.

The elastic structure 95, according to the exemplary embodiment, may have substantially the same or similar configuration as that of the elastic structure 90, e.g., the elastic structure 95 may be an elastic plate configured to apply elastic forces to a fuse part 53' and may be disposed in a fuse hole 53a'. Therefore, a detailed description of the elastic structure 95 will be omitted below.

Referring to FIGS. 12 and 13, the first insulating member supporting member 66', according to the exemplary embodiment, may include, e.g., a body 661', an elastic structure support protrusion 662', and a gas discharging hole 663'. The elastic structure fixing member 96, according to the exemplary embodiment, may include a fixing member body 96a and a fixing member protrusion 96b.

According to an exemplary embodiment, the fuse part 53' provided with the fuse hole 53a' may be formed in a first electrode coupling part 51' of a first electrode current collecting member 50'. The fuse part 53' provided with the fuse hole 53a' may be positioned between the lower protruding part 64b of the first insulating member 60b and the elastic structure support protrusion 662' of the first insulating member supporting member 66'. The elastic structure 95 may be inserted into the fuse hole 53a' while being supported by the elastic structure support protrusion 662'. For example, the lateral ends of the elastic structure 95 may be coupled with, e.g., directly contacting, the elastic structure support protrusion 662'.

The elastic structure fixing member 96, according to an exemplary embodiment, may be coupled to the elastic structure coupling hole 641b formed in the lower protruding part 64b of the first insulating member 60b. For example, the fixing member protrusion 96b of the elastic structure fixing member 96 may extend, e.g., may be inserted, through the elastic structure coupling hole 641b. The fixing member body 96a may overlap, e.g., may be on and may cover, the elastic structure coupling hole 641b and portions of the first insulating member 60b surrounding the elastic structure coupling hole 641b.

According to an exemplary embodiment, the elastic structure fixing member 96 may press, e.g., may be in direct contact with and may apply a force thereon, a bent portion of the elastic structure 95. As such, the elastic structure 95 may have be in a first configuration, e.g., in a compressed state. The elastic structure 95 may be in the first configuration when the fuse part 53' is in an untriggered condition. The elastic structure 95 may have a second figuration, e.g., shown in a dotted line in FIG. 13, in which the elastic structure may have a different shape. For example, in the second configuration, the elastic structure 95 may have an expanded shape. The elastic structure 95 may have the expanded shape when the fuse part 53' is in a triggered condition.

When the elastic structure 95 changes from the first configuration to the second configuration, both ends of the elastic structure 95 may contact surfaces of the fuse hole 53a'. Accordingly, the elastic force of the elastic structure 95 may act, e.g., in a direction toward the outside of the fuse hole 53a' (an arrow direction of FIG. 13). The elastic force of the elastic structure 95 may act, e.g., in a direction toward the elastic structure fixing member 96.

With the elastic structure 95, according to an exemplary embodiment, a distance between the fractured surfaces that are partially melted or fractured due to, e.g., the overcurrent, may be sufficiently maintained so that the possibility of an abnormal phenomenon such as the arc generation, or the like, may be reduced and/or prevented.

As a result, according to the exemplary embodiment, a size of the fuse hole 53a' formed in the fuse part 53' may be freely designed without being limited by strength of the first electrode current collecting member 50' and/or a size of a cross section area of the fuse part 53'. Accordingly, a degree of freedom in design of the fuse part 53' may be increased.

Although the exemplary embodiment describes forming the fuse part 53' having the fuse hole 53a' formed therein in the first electrode current collecting member 50', embodiment are not limited thereto. For example, the fuse part having the fuse hole formed therein may be formed in the second electrode current collecting member 70.

By way of summation and review, a rechargeable battery or a secondary battery is a battery that may be recharged and discharged, unlike a primary battery that cannot be recharged. A low-capacity rechargeable battery may be used for, e.g., small portable electronic devices such as a mobile phone, a notebook computer, and a camcorder. A large-capacity rechargeable battery may be used as, e.g., a power supply for driving a motor of a hybrid car, or the like, or a large-capacity power storage device.

A high-output rechargeable battery using a non-aqueous electrolyte solution of high energy density has been developed. The high-output rechargeable battery may be configured of a large-capacity battery module in which a plurality of rechargeable batteries are connected to each other in series so as to be used to drive a motor of devices requiring large power, e.g., an electric car, or the like. The rechargeable battery may have a cylindrical shape, a square shape, or the like.

In order to reduce the possibility of and/or prevent the rechargeable battery from exploding due to, e.g., the generation of overcurrent in the rechargeable battery, a safety apparatus including a fuse part may be installed in the rechargeable battery. However, in some instances, the fuse part may only be partially melted or fractured due to, e.g., the overcurrent. When fractured surfaces of the fuse part are too close to each other to block electricity, an abnormal phenomenon such as arc generation, or the like, may occur. Further, when the partially fractured surfaces of the fuse part may not adequately block the flow of overcuurrent, e.g., the overcurrent may still flow in the rechargeable battery, and the rechargeable battery may explode.

In contrast, embodiments, e.g., the exemplary embodiments discussed above, relate to a battery including a structure capable of maintaining a distance between fractured surfaces of a fuse part formed when the fuse part is melted or fractured due to, e.g., generation of overcurrent in the rechargeable battery. Accordingly, the possibility of the abnormal phenomenon such as the arc generation, or the like, occurring may be reduced and/or prevented. Embodiments relate to a rechargeable battery including a structure capable of reducing a risk of an explosion of the rechargeable battery, or the like, at the time of generation of overcurrent in the rechargeable battery. Embodiments may include an electrode assembly, a case in which the electrode assembly is embedded, a cap plate coupled to an opening of the case, and a insulating member and an electrode current collecting member installed in the case. The electrode current collecting member may be provided with a fuse part including a fuse hole and the fuse part may be adjacent to an elastic structure made of an elastic material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, the embodiments are intended to cover various modifications and equivalent arrangements and it will be understood by those of skill in the art that various changes in form and details may be made without departing from the spirit and scope of the present invention as set forth in the following claims.

What is claimed is:

1. A rechargeable battery, comprising:
   a case;
   an electrode assembly in the case;
   a current collecting member electrically connected to the electrode assembly;
   a fuse part in the current collecting member;
   an elastic member adjacent to the fuse part, the elastic member being in an elastically forcible relationship with the fuse part to provide an elastic force to the fuse part; and
   an insulating member between the current collecting member and the electrode assembly, the insulating member supporting the elastic member,
   wherein:
      the fuse part is in a terminal coupling part of the current collecting member, the fuse part including a fuse hole therein,
      a fuse hole coupling protrusion of the insulating member is in the fuse hole, and
      the elastic member is in a coupling hole of the insulating member such that the elastic member is between the terminal coupling part and the insulating member.

2. The rechargeable battery as claimed in claim 1, wherein the elastic member is an elastic plate.

3. The rechargeable battery as claimed in claim 1, wherein:
the fuse part constitutes a narrow region of the current collecting member, the fuse part being changeable from an untriggered condition to a triggered condition; and
the elastic member having a first configuration in the untriggered condition of the fuse part and a second configuration in the triggered condition of the fuse part, the first configuration being different from the second configuration.

4. The rechargeable battery as claimed in claim 3, wherein the elastic member has the second configuration when the fuse part is fractured or melted so as to impart the triggered condition.

5. The rechargeable battery as claimed in claim 3, wherein, in the first configuration the elastic member engages the fuse part.

6. The rechargeable battery as claimed in claim 3, wherein:
in the first configuration, the elastic member has a compressed shape; and
in the second configuration, the elastic member has an expanded shape.

7. The rechargeable battery as claimed in claim 3, wherein:
in the first configuration, the elastic member is bent at a first predetermined angle; and
in the second configuration, the elastic member is bent at a second predetermined angle, the second predetermined angle being greater than the first predetermined angle.

8. The rechargeable battery as claimed in claim 3, wherein:
in the first configuration, lateral ends of the elastic member are spaced apart by a first distance; and
in the second configuration, lateral ends of the elastic member are spaced apart by a second distance, the second distance being greater than the first distance.

9. The rechargeable battery as claimed in claim 3, wherein:
in the first configuration, the elastic member is bent at a first predetermined angle; and
in the second configuration, the elastic member is bent at a second predetermined angle, the second predetermined angle being less than the first predetermined angle.

10. The rechargeable battery as claimed in claim 3, wherein:
in the first configuration, lateral ends of the elastic member are spaced apart by a first distance; and
in the second configuration, lateral ends of the elastic member are spaced apart by a second distance, the second distance being less than the first distance.

* * * * *